United States Patent [19]

Nilssen

[11] Patent Number: 4,942,348

[45] Date of Patent: Jul. 17, 1990

[54] ELECTRONIC AIR REGISTER CONTROLLER

[76] Inventor: Ole K. Nilssen, Caesar Dr., Rte. 5, Barrington, Ill. 60010

[21] Appl. No.: 320,503

[22] Filed: Mar. 8, 1989

Related U.S. Application Data

[63] Continuation-in-part of Ser. No. 17,084, Feb. 20, 1987, Pat. No. 4,835,413.

[51] Int. Cl.[5] .............................................. G05D 23/00

[52] U.S. Cl. .................................... 318/468; 318/471; 236/1 G; 137/553

[58] Field of Search .................. 307/141; 318/16, 467, 318/468, 471, 473; 137/79, 80, 552.7, 553, 554, 624.11, 624.13, 624.14, 624.15, 624.16, 624.17, 624.21; 98/121.2; 165/42, 43; 236/1 G, 12.11, 12.12, 35.2, 35.3, 46 F; 251/129.01, 129.04

[56] References Cited

U.S. PATENT DOCUMENTS

| | | | |
|---|---|---|---|
| 3,708,068 | 1/1973 | Tischler | 137/624.15 X |
| 3,978,887 | 9/1976 | Dryla | 137/624.15 |
| 4,090,532 | 5/1978 | Story, Jr. | 137/624.15 |
| 4,244,517 | 1/1981 | Stanke et al. | 251/129.04 X |
| 4,485,863 | 12/1984 | Yoshida et al. | 165/42 |
| 4,550,874 | 11/1985 | Clouser et al. | 236/1 G |
| 4,685,508 | 8/1987 | Iida | 165/43 X |
| 4,779,839 | 10/1988 | Sears | 251/129.04 X |
| 4,797,820 | 1/1989 | Wilson et al. | 137/624.13 X |
| 4,824,012 | 4/1989 | Tate | 137/624.11 X |
| 4,829,884 | 5/1989 | Kagohata | 165/43 X |
| 4,858,677 | 8/1989 | Doi et al. | 165/43 X |

*Primary Examiner*—Bentsu Ro

[57] ABSTRACT

A self-contained electronic air register controller can easily be mounted directly onto the outside of an air register. When so mounted, the controller engages the register's actuating lever and permits automatic opening and closing of the air register by way of simple programming instructions and/or by way of a temperature sensor. The controller comprises a small battery, a miniature electric motor with a gear/linkage mechanism operable to engage with and to move the register's actuating lever between its OPEN and SHUT positions, and a quartz-clock-based programming means.

23 Claims, 2 Drawing Sheets

ELECTRONIC AIR REGISTER CONTROLLER

Related Application

The present application is a Continuation-in-Part of Ser. No. 07/017,084 filed Feb. 20, 1987 now U.S. Pat. No. 4,835,413.

BACKGROUND OF THE INVENTION

1. Field of Invention

The present invention relates to means for automatically opening and closing an air register in response to a pre-set clock-based program and/or in response to a temperature sensor.

2. Comments re Prior Art

Present air registers of the wall-mounted types usually used in homes are manually operated and are so inconvenient to adjust that, once adjusted, they are normally left alone.

SUMMARY OF THE INVENTION

1. Objects of the Invention

An object of the present invention is that of providing an electrically actuatable air register means.

Another object is that of providing an air register that is capable of automatically opening and closing in response to a control input, yet without being connected with the power line.

Still another object is that of providing a self-contained means for controlling an air register.

These as well as several other important aspects, objects and advantages of the present invention will become apparent from the following description.

2. Brief Description

An electronic air register controller can easily be mounted directly onto the outside of an air register. When so mounted, the controller engages the register's actuating lever and permits automatic opening and closing of the air register by way of simple programming instructions and/or by way of a temperature sensor.

The controller comprises a small battery, a miniature electric motor with a gear/linkage mechanism operable to engage with and to move the register's actuating lever between its OPEN and SHUT positions, and a quartz-clock-based programming means.

Brief Description of the Drawings

FIG. 2 shows subject electronic controller means in two perspective view.

DESCRIPTION OF THE PREFERRED EMBODIMENT

Details of Construction

Figure 1:
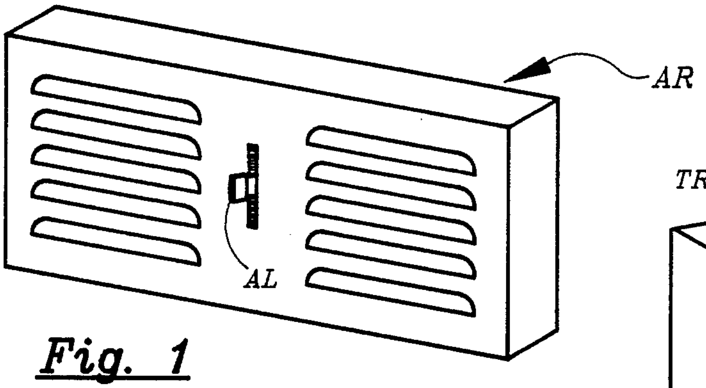
FIG. 1 represents an external view of a substantially ordinary wall-mounted air register.

FIG. 1 shows a predominantly frontal view of a substantially ordinary wall-mounted air register AR. This air register has an actuating lever AL.

Figure 2A:
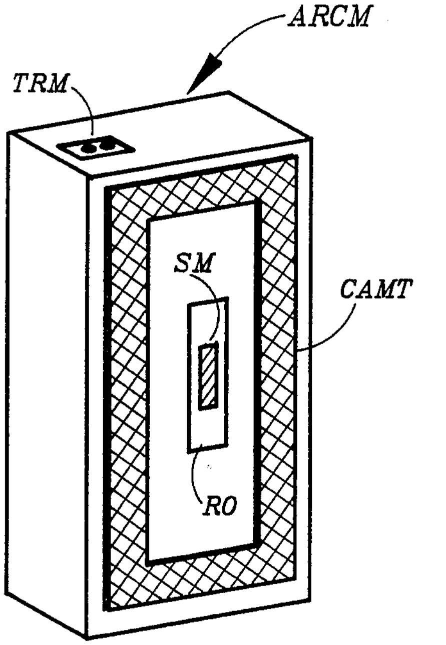
FIG. 2*a* shows a view predominantly from the rear.

FIG. 2*a* shows a view predominantly from the rear of the air register controller means ARCM. Positioned substantially in the middle of the rear surface of this controller means is a rear opening RO operable to receive actuating lever AL via slot means SM. Positioned on the top of the controller means is a thermostat receptacle means TRM. Compressible adhesive mounting tape CAMT is positioned on the back surface of the controller means.

Figure 2B:
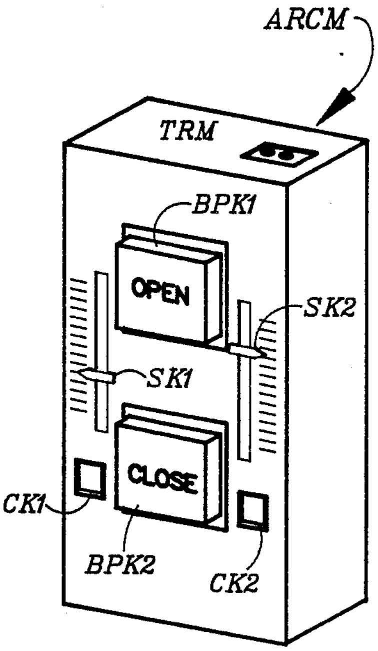
FIG. 2*b* shows a view predominantly from the front.

FIG. 2*b* shows a view predominantly from the front of subject controller means ARCM. Positioned in the middle of the upper part of the front surface is a first bypass key BPK1 marked OPEN; and positioned in the middle of the lower part of the front surface is a second bypass key BPK2 marked CLOSE. Near the left edge of the front surface is a first slide key SK1, and just below it is a first cycle key CK1; near the right edge of the front surface is a second slide key SK2, and just below it is a second cycle key CK2.

Figure 3:
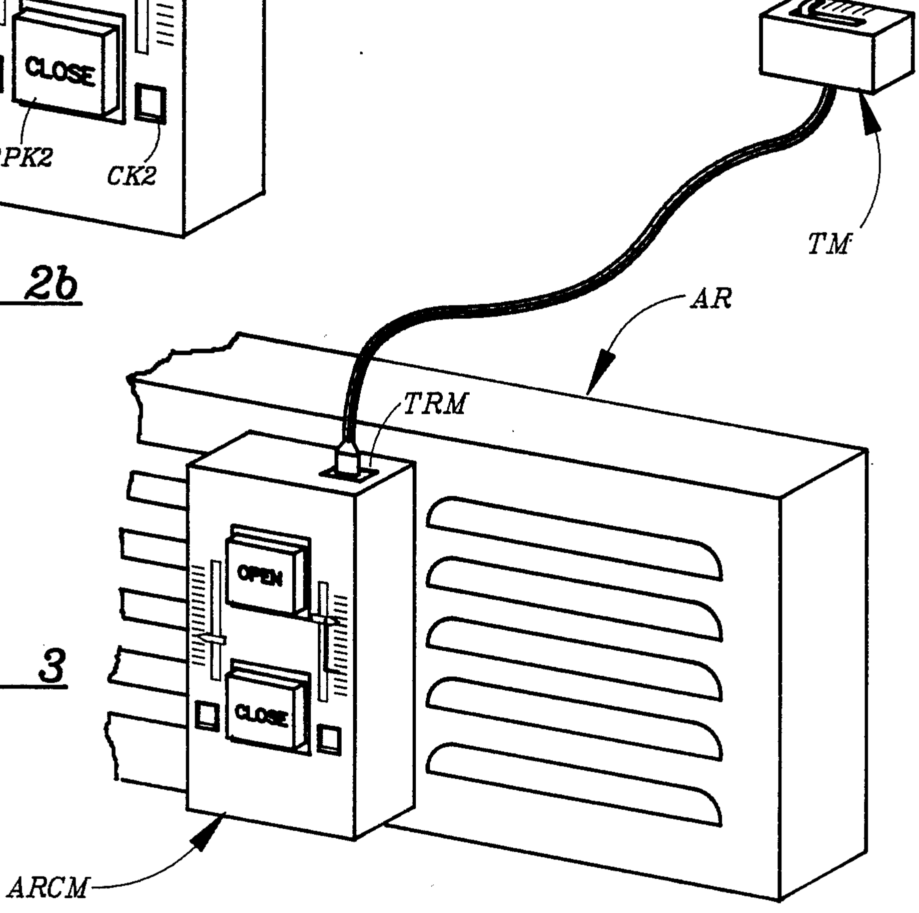
FIG. 3 shows the electronic controller means as mounted on an air register.

FIG. 3 shows controller means ARCM mounted on an ordinary wall-mountable air register AR, being fastened right onto the front thereof by way of the adhesive mounting tape CAMT. A thermostat means TM is connected with receptacle means TRM.

Figure 4:
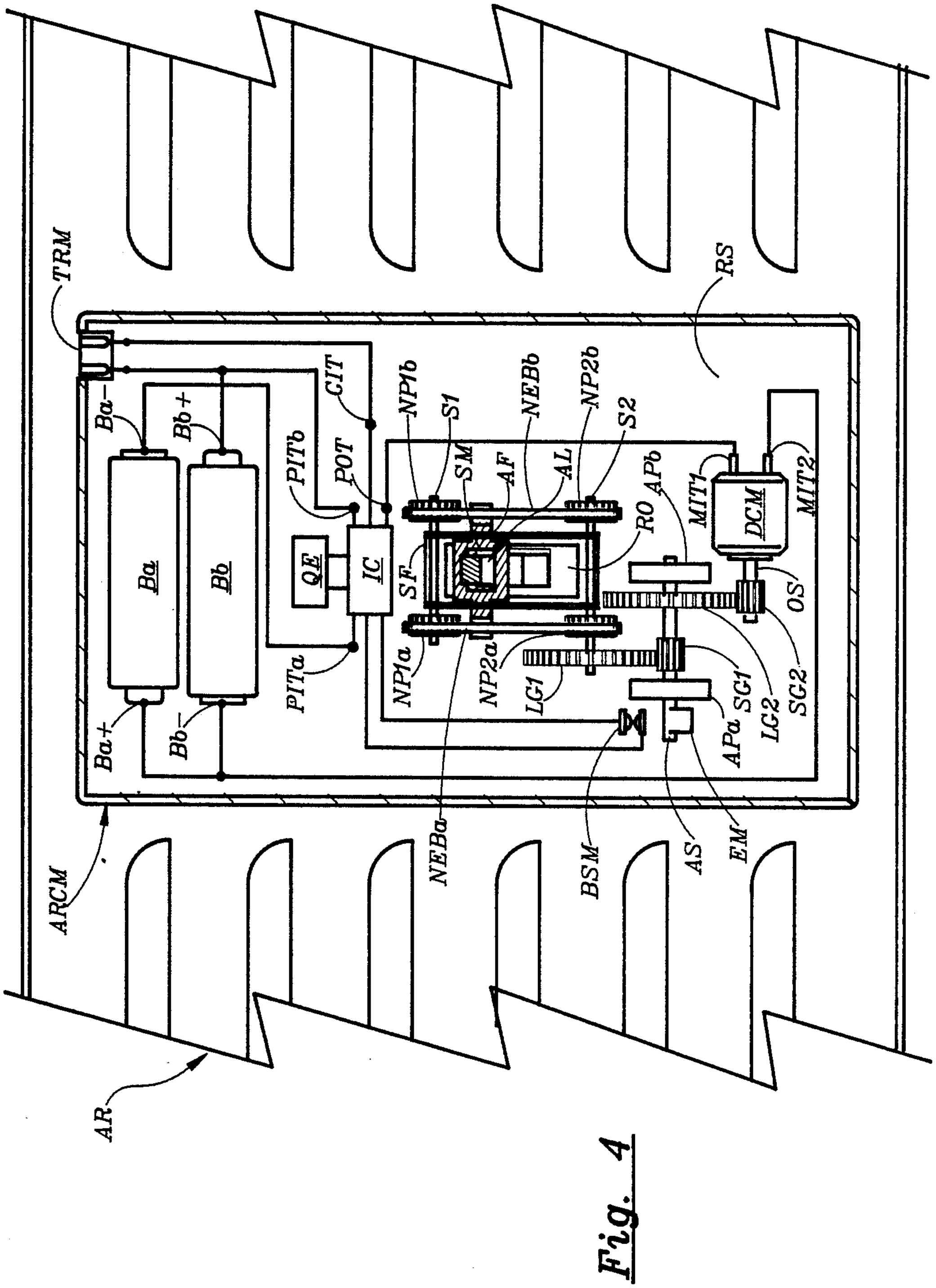
FIG. 4 represents a front view of the key components comprised within the electronic controller means.

Fig. 4 shows a schematic frontal view of the inside of controller means ARCM as mounted onto the front of an air register. Actuating lever AL, which protrudes through rear opening RO, is shown in its OPEN position. Surrounding rear opening RO and fastened onto the rear surface RS of the controller means is a rectangular support frame SF.

A first shaft S1 with notched pulleys NP1*a* and NP1*b* is supported by this frame near its upper extremity; a second shaft S2 with notched pulleys NP2*a* and NP2*b* is supported by this frame near its lower extremity. Both of these shafts are free to rotate, but are not free to move in any other respects.

A notched endless belt NEB*a* connects pulley NP1*a* with pulley NP2*a*; and a notched endless belt NEB*b* similarly connects pulley NP1*b* with pulley NP2*b*. Symmetrically fastened onto both of these endless belts is an actuator frame AF; in which frame is slot means SM. The actuator frame is so made and positioned as to embrace actuation lever AL. As the actuator frame AF moves, it slides on support frame SF.

Shaft S2 has an extension onto which is mounted a first large gear LG1. An auxiliary shaft AS is rotatably mounted between two auxiliary posts APa and APb; which posts are fastened to the rear surface RS. Mounted onto this auxiliary shaft is a second large gear LG2 and a first small gear SG1. This first small gear SG1 is engaged with the first large gear LG1.

Also mounted onto an extension of this auxiliary shaft AS is an eccentric means EM that operates a preferably bistable switch means BSM once for each complete revolution of shaft AS. This switch means has two terminals, both of which are connected with integrated circuit IC.

A small DC motor DCM is mounted on rear surface RS. On the output shaft OS of this DC motor is mounted a second small gear SG2. This second small gear SG2 is engaged with the second large gear LG2. The DC motor has two electrical power input terminals MITl and MIT2.

A first battery Ba is positioned on the top side of rear surface RS; and a second battery Bb is next thereto. Battery Ba has a Ba− terminal and a Ba+ terminal, with the Ba− terminal being of negative polarity with respect to the Ba+ terminal. Similarly, battery Bb has a Bb− terminal and a Bb+ terminal, with the Bb− terminal being of negative polarity with respect to the Bb+ terminal. The Ba+ terminal is electrically connected with the DC motor's MIT2 terminal as well as with the Bb− terminal.

Integrated circuit IC and a quartz element QE are located near the upper part of the actuator/timer unit. This IC has a number of electrical terminals, most of which are connected with keys BPK1, BPK2, SK1, CK1, SK2 and SK2, as well as with quartz element QE. However, for sake of clarity, and also since they form no part of the present invention, the detailed electrical connections between the IC and keys BPK1/BPK2/SK1/CK1/SK2/CK2 are not shown.

The remaining IC electrical terminals and connections are shown: electrical power input terminal PITa is electrically connected with battery terminal Ba−; electrical power input terminal PITb is electrically connected with battery terminal Bb+; electrical power output terminal POT is electrically connected with motor input terminal MITl; and the two terminals of switch means BSM are connected with two terminals on the IC. The terminals of thermostat receptacle means TRM are connected with the B+ terminal of battery Bb and with a control input terminal CIT of the IC.

Details of Function and Operation

As indicated in FIG. 3, the size and shape of the overall actuator/timer unit are such as to permit mounting on the front of an ordinary air register. To provide for attractive styling, the unit's depth or thickness dimension has been made as shallow as permissible by the size of the actuating lever, yet without having the actuating lever exposed.

To permit the size and shape of subject controller means to be as compact as desired, which degree of compactness is in effect specified by FIG. 3, it is important that the individual components comprised within the actuator/timer unit be fittingly small. In practical reality, this concern is only important in respect to the battery and the motor.

Thus, the electrical power required to be supplied from the built-in battery must be modest enough to permit this battery to be small enough to reasonably fit within the desired specified dimensions of the controller means. Similarly, the mechanical power required to be supplied by the built-in motor must be modest enough to permit this motor to be small enough to reasonably fit within the specified dimensions.

Since a certain amount of energy is required to effect actuation of the actuation lever, the power required is inversely proportional to the time allowed to effect this actuation. Thus, by way of a speed-reducing gear mechanism, it becomes possible to actuate the actuation lever at an arbitrarily small power level.

By allowing complete OPEN-to-CLOSED and CLOSED-to-OPEN actuation to take place over a period of some ten seconds from start to finish, the motor power output requirement gets to be acceptably modest; and actuation can then readily be accomplished by way of a substantially conventional miniature DC motor of dimensions as small as 10 mm×20 mm×20 mm.

As another consequence of allowing as long as ten seconds to effect full actuation of the air register, the electrical power required by the motor now becomes adequately modest to permit the use of two ordinary AA-cells for the built-in battery.

In this connection, it is noted that a two-way direct-action solenoid was considered but found to be inapplicable as the prime mechanical mover in subject controller unit for the basic reasons of being far too large in physical size while at the same time requiring more power than could be delivered by a battery of sufficiently small size. The reason a direct-action solenoid requires such a high level of power is related to the fact that such a solenoid has to develop all the required force and distance (energy) in but a single brief stroke—with no feasible way of trading time for power, as can so easily be done with a motor and a gear mechanism.

That is, with a direct-action solenoid, all the required force and movement (energy) has to be produced in a single-stroke electro-magnetic action; which implies a required peak power level far higher than that resulting when using motoring action (which implies multi-stroke electro-magnetic action) and a speed-reducing gear mechanism.

During the process of actuation, actuator frame AF is apt to slide up and down on the rim of the support frame SF. Also, as the actuation lever is being pushed up or down by the actuator frame, there is a degree of sliding between the actuation lever and the inner edges of the actuator frame. To minimize power waste, low-friction surfaces have been provided.

Further Details of Operation

With reference to FIG. 4, when the DC motor is provided with a DC voltage across its electrical input terminals, the motor's output shaft will rotate in a direction corresponding to the polarity of this DC voltage.

The rotating motor shaft will, by way of the indicated gear and pulley arrangement, cause the actuator frame to move up or down, thereby causing the actuation lever AL to move correspondingly. With the MIT1 terminal being positive with respect to the MIT2 terminal, the motor shaft rotates in such a direction as to cause the actuator frame to move the actuation lever in the down-direction, thereby to cause the damper in the air register to OPEN.

Correspondingly, with the MIT1 terminal being negative with respect to the MIT2 terminal, the motor shaft rotates in such a direction as to cause the actuator frame to move the actuation lever in the up-direction, thereby to cause the damper to CLOSE.

The overall function of the controller means includes the programmed actuation by the IC of the DC motor in the one or the other direction, thereby moving the actuation lever either up or down to correspondingly CLOSE and OPEN the damper in the air register in accordance with whatever program has been programmed into the IC. The quartz element in combination with the IC acts as an accurate clock, and therefore as an accurate time-base for providing programmable diurnally repetitive CLOSE/OPEN actuations of the air register.

Also, the controller means permits manual override by pressing either: (i) bypass key BPK1, thereby to cause the air register to OPEN and to remain open until it is next commanded to CLOSE; or (ii) bypass key BPK2, thereby to cause the air register to CLOSE and to remain CLOSED until it is next commanded to OPEN.

Finally, the controller means provides for thermostat means TM to cause the air register to CLOSE and OPEN in response to the temperature to which the thermostat means is exposed.

With reference to FIG. 3, once mounted in its place on an air register, the operation and programming of subject controller means may be described as follows.

(i) Whenever it is desired to OPEN the damper in the air register, it is only necessary to press bypass key BPK1.

(ii) Whenever it is desired to CLOSE the damper in the air register, it is only necessary to press bypass key BPK2.

(iii) Whenever it is desired to program the controller means such as to cause the damper to OPEN and to remain open for a first predetermined period each 24 hours, it is only necessary to press cycle key CK1 at the particular time-of-day when the first period is to start. Thereafter, this first period will be repeated every 24 hours, until cycle key CK1 is again pressed. The duration of this first period is adjusted as desired by slide key SK1. The first period can be abrogated at any time, by action of bypass key BPK2, without affecting the programming (iv) Whenever it is desired to program the controller means such as to cause the damper to OPEN and to remain open for a second predetermined period each 24 hours, it is only necessary to press cycle key CK2 at the particular time-of-day when the second period is to start. Thereafter, this second period will be repeated every 24 hours, until cycle key CK2 is again pressed. The duration of this second period is adjusted as desired by slide key SK2. The second period can be abrogated at any time, by action of bypass key BPK2, without affecting the programming.

(v) Whenever it is desired to OPEN and CLOSE the damper in response to a temperature at a given location, thermostat means TM is placed at that location and, by way of a light-weight connect wire and plug means, plugged into thermostat receptacle means TRM. Thereafter, a first signal will be provided from the thermostat each time the temperature increases above a desired (or set) temperature and a second signal will be provided from the thermostat each time the temperature decreases below a desired (or set) temperature. Whenever the first signal is provided, the controller means acts to CLOSE the damper in the air register; whenever the second signal is provided, the controller means acts to OPEN the damper in the air register.

Whenever the thermostat means is indeed connected with the controller means, any input provided by way of a bypass key will be: (a) ignored if this input were to command the damper to OPEN when it already be OPEN; (b) ignored if this input were to command the damper to CLOSE when it already be CLOSED; or (c) observed, but cancelled next time the thermostat means calls for the controller means to change the state or orientation of the damper.

Additional Explanations and Comments (a) With reference to FIG. 4, when actuated by bypass key BPK1, or by bypass key BPK2, or by thermostat means TM, or by its internal program, the IC provides a DC voltage of one or the other polarity to the DC motor. This DC voltage is provided for as long as it takes for switch means SM to open and close 12 times, which represents a movement of the actuator frame AF that is adequate to make the actator lever move from its one extreme position to its other extreme position, but not for longer than a certain preset time period (typically about ten seconds).

(b) The actuator frame may be stopped by the actuation lever at the end of its allowed travel (thereby, in turn, possibly causing the motor to stall) while the IC is still providing voltage to the motor. However, the magnitude of the current absorbed by the stalled motor is not much larger than that of the motor's normal running current. Of course, depending upon the degree of force required to overcome the detent means by which the actuator frame AF is connected with the notched endless belts (which degree of force can be adjusted by design and/or during manufacturing), the motor may continue to run even after the actuator frame has come to a stop.

(c) It is not necessary to use a center-tapped battery for the proper operation of the actuator/timer unit. A single battery could be used in conjunction with providing for double-pole double-throw switching, either by the IC or by mechanical means actuated in accordance with the position of the actuator frame. Or, as yet another alternative, it would be possible to use a single battery in combination with a three-terminal motor.

(d) The air register may be of most any ordinary type: wall-mounted, baseboard-mounted or even floor-mounted. However, to make the air register work effectively with subject controller means, it is important to make its adjustment lever move rather freely; which most often requires a slight modification from current practice. Also, it is necessary that the actuation lever clearly project outside of the body of the air register; which, in retrofit installations, sometimes requires the use of a small lever extension means.

(e) For most effective results it is clearly best to provide an air register particularly made so as to permit easy mounting and use of the controller means.

(f) The controller means may be made an integral part of the air register; in which case, especially for floor-mounted registers, it would best be mounted internally of the grille.

(g) In a home with an ordinary centrally-controlled forced air heating/cooling system, the controller means—when actuated by its thermostat means, as indicated—would be able to maintain a given temperature in a given room. To permit it to do so, the air-feed to that room should be sufficient—with the air register fully open—to provide more heating/cooling than required. Then, without having to be connected to the central furnace or air conditioning system, the controller means would be able to control the temperature in that given room.

That is, the controller means—when applied to an air register in a given room—is operable to maintain the temperature in that room: (a) when heating, at a preset reduced level as compared with what the temperature would have been without the controller means; and (b) when colling, at a preset increased level as compared with what the temperature would have been without the controller means.

(h) The controller means is time-programmable, which refers to the particular feature that provides for this controller means to be so affected or adjusted (i.e., programmed) as to cause it to operate (i.e., to actuate and de-actuate the damper in the air register) repeatedly and continuously in accordance with a 24 hour (or other cyclical) time pattern, until such time as it is re-adjusted or re-programmed.

The value associated with a time-programmable controller means is that it can be used for keeping a damper in an air register open during certain hours of the day, while keeping it closed during certain other hours of the day. That way, for instance, in a home, a bedroom may be kept substantially unheated during the day while being kept heated during the night.

(i) The controller means may readily be arranged so as to cause it to move the damper (or the actuation lever) between any two positions; which two positions do not necessarily have to be fully OPEN or fully CLOSED. In fact, by providing for suitable programming means, the damper may be programmed in a wide-range completely analog manner: to move to any position commanded by the program.

(j) Slide keys SK1 and SK2 actually operate linear potentiometers; which are connected with the IC and operative, by way of their resistance settings, to determine the durations of the ON-times associated therewith.

(k) It is readily possible, by way of using one or more additional potentiometers, or by using a key board means, to permit a more complex programming of the ON-period of the 24 hour cycle.

(l) The IC, in combination with quartz element QE, actually constitutes a clock with a 24 hour basic repetition cycle. By providing an ordinary clock display, time-of-day can readily be provided.

(m) A non-linear (quasi logarithmic) calibration scale is provided next to both slide keys (SK1 and SK2), thereby permitting easy and accurate establishment of the desired ON-periods.

(n) Bypass and cycle keys BPK1, BPK2, CK1 and CK2 each represents the mechanical actuating portion of a momentary electrical switch. Thus, the IC responds to the momentary action of an electrical switch means.

(o) It is emphasized that all the functions and features described in connection with the controller means and its various related and constituent elements are of such nature as to be readily accomplishable by means well known to those skilled in the art pertinent thereto.

(p) It is anticipated that thermostatic means TM be an ordinary adjustable bimetallic switch element means; which is to say: an ordinary thermostat. However, it may be of various different constructions. For instance, it might be constituted of a temperature-sensitive resistance means, such as a thermistor. In any case, it should have a selection means operative to permit selection between a mode for heating and a mode for cooling.

Otherwise, such selection means may readily be provided as part of the function of the controller means.

(q) For some applications, it is anticipated that the controller means be provided as an entity integral with a structure means having its own grill and damper means; which controller/structure means would be mounted onto and/or in front of an extant air register in such manner as to completely cover it and to control the air flow from it. In that situation, the extant air register should be left with its damper in the fully open position; and the control of air flow would be entirely accomplished by the added controller/structure means.

This add-on controller/structure means would preferably be fastened by adhesive means (such as two-sided construction tape) onto the wall surface around the periphery of the extant air register, or onto the extant air register's rim.

(r) In a more deluxe version, it is anticipated that the controller means be combined with a receiver means operative to receive a wireless signal; which signal, in turn, would be able to activate/control the controller means from some suitable remote location. Similarly, it is anticipated that the thermostat means be combined with a battery-powered signal transmitter means, thereby to permit it to activate/control the controller means from some remote location.

(s) An air damper means is herein defined as any means operable, in response to some mechanical action, to control the flow of air through an air duct.

(t) It is noted that for the type of operation anticipated for subject electronic air register controller, the durability of an ordinary alkaline battery would be several years; which implies that few installations would have any real need to provide for power-line-operated power supplies. Replacing batteries once every several years would not constitute a significant detriment, particularly since the air register controller would normally be so located as to be readily accessible.

(u) However, for situations where it be unacceptable to have the air register controller powered by a battery, it is anticipated that a small power-line-connected Class-2 power supply be provided in its place. That way, the power output conductors from the Class-2 power supply may be handled and routed in the manner of ordinary bell wires. (According to the National Electric Code, a Class-2 power supply is one wherein the maximum available output power is so low as to be considered safe from fire initiation hazard. Of course, a battery of the type indicated herein would clearly come under the definition of a Class-2 power supply.)

(v) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. In a home or office having a forced air heating-/cooling system with an air duct, the improvement comprising:

air flow control means mounted in relationship with the air duct and operative to control the flow of air therethrough; the air flow control means comprising: (i) electric motor means operatively connected with an air damper means; (ii) electric energy means connected with the electric motor means and operative in response to control actions provided at a control input to provide electric power thereto, thereby to permit control of the air damper means without requiring connection with an external source of electric power, such as an electric utility power line; and (iii) control action means connected with the control input and operative to provide said control actions;

whereby the air flow control means is operable to control the flow of air through the air duct in response to the control actions provided by the control action means, yet without having any electrical connection with a power source external of the air flow control means.

2. The improvement of claim 1 wherein the electric energy means comprises an electric battery.

3. The improvement of claim 1 wherein the electric motor means comprises a DC motor.

4. The improvement of claim 1 combined with programming means operative, in response to a pre-established program, to control the operation of the air flow control means.

5. The improvement of claim 4 wherein the programming means provides for the pre-established program to be repeated on a periodic basis.

6. The improvement of claim 1 wherein: (i) the air duct has an outlet; and (ii) the air flow control means is mounted at this outlet;

thereby controllably to impede the flow of air therefrom.

7. The improvement of claim 1 wherein the control action means is combined with temperature sensing means operative, in response to a set of temperatures, to provide at least some of said control actions.

8. The improvement of claim 7 wherein the temperature sensing means is located remotely from the air flow control means.

9. The improvement of claim 1 wherein: (i) the damper means may assume a position; and (ii) the electric motor means is operable to control the position of the damper means such that the damper means may controllably and alternatively assume a substantially open position and a substantially closed position.

10. The improvement of claim 9 wherein the electric motor means is operable to control the position of the damper means such that the damper means may controllably assume positions between the substantially open position and the substantially closed position.

11. In a home having a forced air heating/cooling system, the heating/cooling system having an air duct connected therewith and operative to duct heated or cooled air to an air register located in a room of the home, the air register having a damper means and being plainly visible from a position inside of the room, the improvement comprising:

air flow control means combined with the air register and operative to control the flow of air therethrough; the air flow control means comprising: (i) electric motor means operatively connected with the damper means; (ii) electric energy means connected with the electric motor means and operative in response to control actions provided at a control input to provide electric power thereto, thereby to permit control of the damper means; and (iii) control action means connected with the control input and operative to provide said control actions;

whereby the air flow control means is operable to control the amount of air provided by the air register in response to the control actions provided by the control action means, yet without having to be connected with an electric utility power line.

12. The improvement of claim 11 wherein the electric energy means comprises an electric battery means.

13. The improvement of claim 11 wherein the air flow control means is mounted on the air register in such manner as to cover at least part of the air register when viewed from a position inside of the room.

14. The improvement of claim 11 wherein the electric motor means comprises a DC motor.

15. The improvement of claim 11 wherein the electric motor means has a motor shaft operable to rotate in either direction depending upon the manner in which electric power is provided to the electric motor means.

16. In a home having a forced air heating/cooling system, the heating/cooling system having a central heating/ cooling unit and an air duct operative to duct heated or cooled air from the central heating/cooing unit to an aperture in a room in the home, the improvement comprising:

air flow control means mounted at the aperture and operative to control the flow of air therethrough; the air flow control means having: (i) air damper means; (ii) electric motor means operatively connected with the air damper means; (iii) electric energy means connected with the electric motor means and operative in response to control actions provided at a control input to provide electric power thereto, thereby to permit control of the air damper means; and (iv) control action means connected with the control input and operative to provide said control action;

whereby the air flow control means is operable to control the amount of air flowing through the aperture in response to the control actions provided by the control action means yet without having to be connected with an electric utility power line.

17. The improvement of claim 16 wherein the electric energy means comprises an electric battery.

18. The improvement of claim 16 wherein the electric motor means comprises a DC motor.

19. The improvement of claim 16 wherein the control action means comprises program means operative, in response to manual input, to provide said control action in a pre-programmed manner.

20. The improvement of claim 16 wherein the control action means is operative to provide at least some of said control actions in response to a temperature.

21. An air register means for use in a home having a forced air heating/cooling system; the heating/cooling system having a central heating/cooling unit and an air duct operative to duct heated or cooled air from the central heating/cooling unit to an aperture in a room in the home; the air register means comprising:

air damper means;

electric motor means operatively connected with the air damper means;

electric energy means connected with the electric motor means and operative in response to control actions provided at a control input to provide electric power thereto, thereby to permit control of the air damper means; and control action means connected with the control input and operative to provide said control actions;

whereby the air register means is operable to control the amount of air flowing through the aperture in response to the control actions provided by the control action means, yet without having to be connected with an electric utility power line.

22. The air register means of claim 21 wherein the electric energy means comprises an electric battery.

23. The air register means of claim 22 wherein the electric battery may be removed and replaced by a person located in the room.

* * * * *